US007145497B2

(12) United States Patent
Krikorian et al.

(10) Patent No.: US 7,145,497 B2
(45) Date of Patent: Dec. 5, 2006

(54) ROBUST DETECTION TECHNIQUE OF FIXED AND MOVING GROUND TARGETS USING A COMMON WAVEFORM

(75) Inventors: Kapriel V. Krikorian, Calabasas, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 118 days.

(21) Appl. No.: 11/031,240

(22) Filed: Jan. 7, 2005

(65) Prior Publication Data

US 2006/0152402 A1  Jul. 13, 2006

(51) Int. Cl.
*G01S 13/90* (2006.01)
(52) U.S. Cl. .................. 342/25 A; 342/25 C; 342/25 F; 342/161; 342/194; 342/195
(58) Field of Classification Search ............... 342/25 R, 342/25 A, 25 B, 25 C, 25 D, 25 E, 25 F, 342/159–163, 190–197
See application file for complete search history.

(56) References Cited

U.S. PATENT DOCUMENTS

| H910 H | * | 4/1991 | Hindenach ................. 342/25 F |
|---|---|---|---|
| H1181 H | * | 5/1993 | Rihaczek ................... 342/25 F |
| 5,394,151 A | * | 2/1995 | Knaell et al. .............. 342/25 F |
| 6,037,893 A | * | 3/2000 | Lipman ...................... 342/25 F |
| 6,677,885 B1 | * | 1/2004 | Frankot ...................... 342/25 R |
| 6,853,330 B1 | * | 2/2005 | Krikorian et al. ........... 342/149 |
| 6,888,490 B1 | * | 5/2005 | Brovko et al. .............. 342/25 A |
| 6,914,553 B1 | * | 7/2005 | Beadle et al. .............. 342/25 R |
| 2003/0023383 A1 | * | 1/2003 | Stark ........................... 702/14 |

(Continued)

FOREIGN PATENT DOCUMENTS

JP    04264285 A  *  9/1992

OTHER PUBLICATIONS

"The imaging algorithm for steadily flying and maneuvering big targets", Proceedings of the SPIE—The International Society for Optical Engineering, 2001, vol. 4382, p. 182-90, 12, Xing-Mengdao, Bao-Zheng.*

*Primary Examiner*—John B. Sotomayor
(74) *Attorney, Agent, or Firm*—Leonard A. Alkov; John E. Gunther; Karl A. Vick

(57) ABSTRACT

Detection of moving targets in SAR images is improved by a radar on a moving platform for generating a focused synthetic aperture image of a scene The scene contains a target described by pixels within the SAR image. The radar has a monopulse antenna having a sum channel output and a difference channel output feeding analog to digital converters for converting the sum channel output and difference channel output into respective digital streams concurrently. The digital streams generate a difference channel SAR image and a sum channel SAR image.

Target ratios are computed for those pixels descriptive of a target within the scene. Background ratios are computed for pixels around the target. Target ratios and background ratios define respective least square fit of angle discriminants. Comparing the target least square fit of angle discriminant with the background least square fit angle discriminant identifies an angle offset and a Doppler offset of the target with respect to the background.

The background least square fit of angle discriminant using background ratios is computed for a region around the target. A 20 by 20 sum synthetic aperture pixels is evaluated as a background around the target.

12 Claims, 4 Drawing Sheets

U.S. PATENT DOCUMENTS

2003/0193335 A1* 10/2003 Patch et al. ................. 324/307

2005/0057391 A1* 3/2005 Forsley et al. ............ 342/25 A

* cited by examiner

ROBUST DETECTION TECHNIQUE OF FIXED AND MOVING GROUND TARGETS USING A COMMON WAVEFORM

BACKGROUND OF THE INVENTION

1. Field of the Invention

This invention is in the field of fixed and moving target detection in Synthetic Aperture Radar (SAR) imaging.

2. Description of the Related Art

Synthetic Aperture Radar (SAR) radar is used for ground mapping as well as moving/stationary target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is combined to arrive at a high resolution SAR image.

The plurality of returns creating a SAR image generated by the transmitted pulses along a presumed known path of the platform make up a frame length. Theoretically, during the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length. The clarity of a SAR image is in many respects dependent on the quality of the motion compensation applied to each radar return prior to SAR image computation. Motion compensation shifts the phase of each radar sample (typically an I+jQ complex quantity derived from an analog to digital converter) in accordance with the motion in space of the moving platform. The SAR imaging process depends on the coherent, phase accurate summing of all radar returns expected within a frame.

The cost of airborne radars is dependent on the signal processing resources installed. Where a small antenna is used to allow for reduced cost, the clutter associated with the image is spread out in Doppler thus placing ground moving targets traveling at speeds of interest within the main lobe clutter. When coupled with relatively short array times necessitated to cover a large search area, a reduced cost radar is precluded from using multiple modes and waveforms to detect fixed and moving targets within the SAR image.

SUMMARY OF THE INVENTION

Above limitations are reduced and the detection of moving targets in SAR images is improved by a radar on a moving platform for generating a focused synthetic aperture image of a scene from a sequence of periodic pulse returns from said scene. Said scene contains a target described by pixels within said synthetic aperture image. Said pulse returns are motion compensated for the motion of said moving platform with respect to said scene. The radar comprises:

a monopulse antenna having a sum channel output and a difference channel output;

a first analog to digital converter for converting said sum channel output into a sum channel digital stream;

a second analog to digital converter for converting said difference channel output into a difference channel digital stream;

said first analog to digital converter and said second analog to digital converter performing analog to digital conversion at a start time and a rate;

a computer for:

receiving said sum channel digital stream and said difference channel digital stream;

generating a plurality of sum synthetic aperture image pixels from said sum channel digital stream;

generating a plurality of difference synthetic aperture image pixels from said difference channel digital stream;

computing a target ratio of said difference synthetic aperture image pixels to said sum synthetic aperture image pixels for said sum synthetic aperture image pixels descriptive of said target;

computing background ratios of said difference synthetic aperture image pixels to said sum synthetic aperture image pixels for said difference synthetic aperture image pixels descriptive of a background around said target;

computing a target least square fit of angle discriminant using said target ratios;

computing a background least square fit of angle discriminant using said background ratios;

comparing said target least square fit of angle discriminant with said background least square fit angle discriminant to identify an angle offset and a Doppler offset of said target with respect to said background.

Said target least square fit angle discriminant is represented by a first line having a first slope and a first intersect along an azimuth axis. Said background least square fit angle discriminant is represented by a second line having said first slope and a second intersect along said azimuth axis. The angle offset is computed by subtracting said second intersect from said first intersect along said azimuth axis. The Doppler offset is computed from the projection of intersections of said angle offset with said first line and said second line on a Doppler filter axis.

The background least square fit of angle discriminant using said background ratios is computed for a region around the target. For example, 20 by 20 sum synthetic aperture pixels can be evaluated as a background around said target.

for pixels of interest defining a target and background in a SAR image; and

Figure 4:
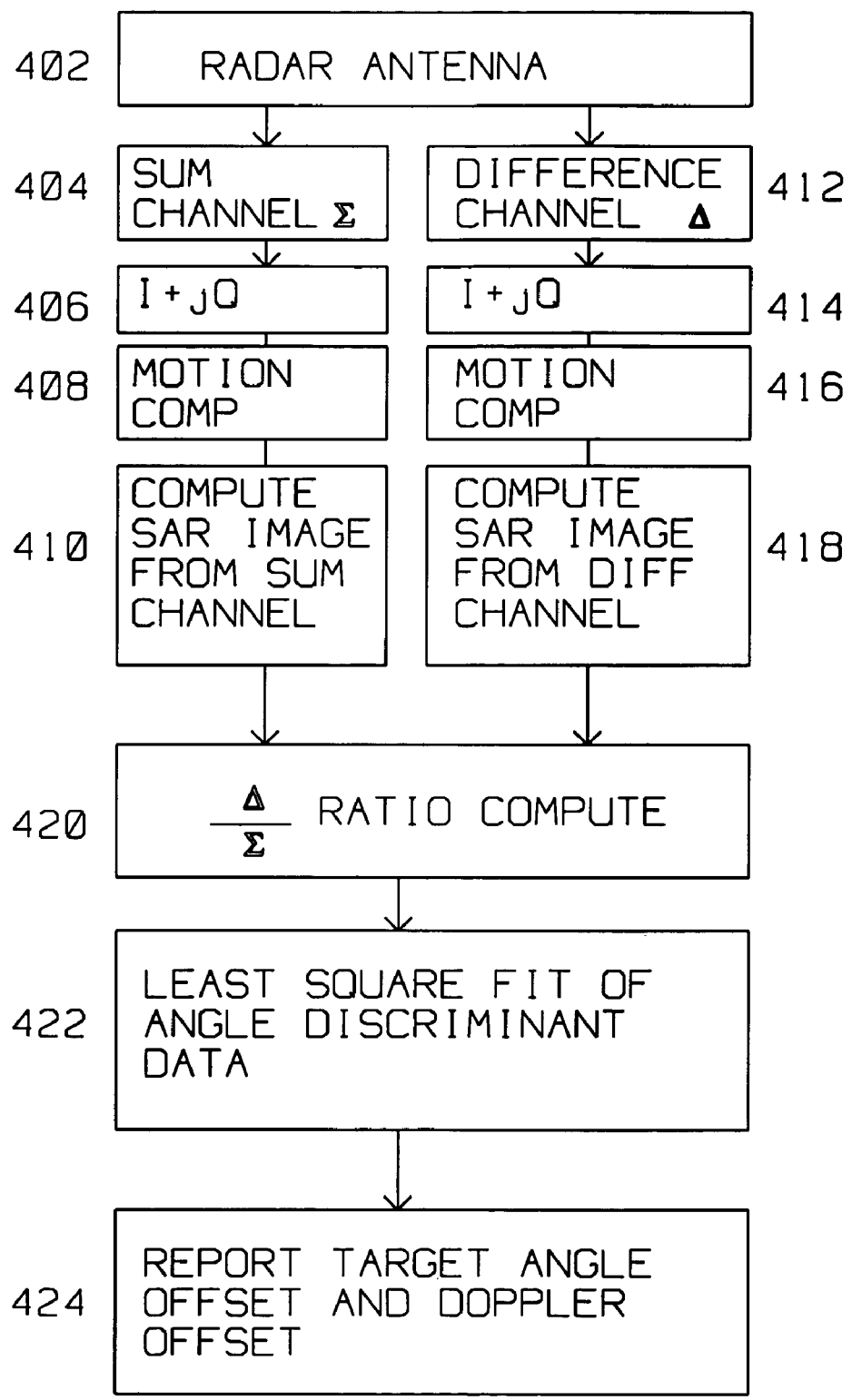

FIG. 4 shows the flow diagram associated with the detection of moving targets using the present invention.

DETAILED DESCRIPTION OF THE INVENTION

The present invention describes a robust detection technique for detecting fixed and moving ground targets using a common waveform in conjunction with the Sum $\Sigma$ and Difference $\Delta$ antenna channels.

Figure 1:
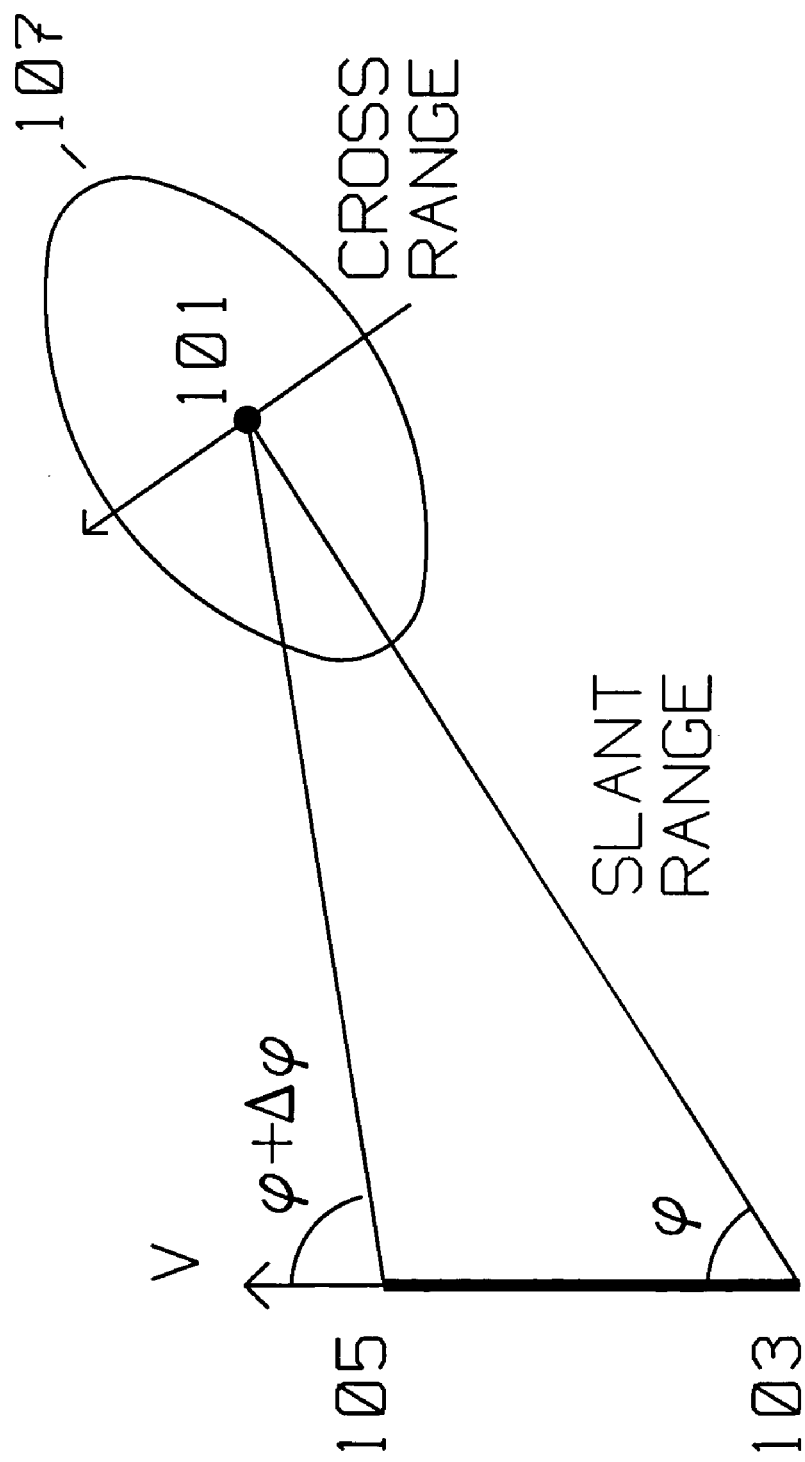
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during array times (frame length), and includes target area 101. Similarly, the antenna receive pattern covers area 107, and includes target area 101. Radar pulses are transmitted and corresponding returns received at many points during the frame length between position 103 and position 105.

Another alternative during SAR operation is "search" mode. Here, a strip of ground is covered by a moving platform generating a SAR image as it progresses along its path. SPA is applicable to both type of SAR radars. Both types of SAR radar are well known in the art and are described, for example, by W. G. Carrara, et al, in *Spotlight Synthetic Aperture Radar*, Artech house, 1995, incorporated herein be reference in its entirety.

A third type of SAR, Doppler Beam Sharpening, relevant to the present invention, is achieved by integrating echo energy as the antenna is scanned in azimuth. Here, for constant azimuthal scanning rate, relatively long integration time will occur at portions of the scanning angle near the direction of platform motion, as compared to the broadside portions of the scan. This tends to produce constant cross path resolution and effectively sharpens the real beam antenna.

Motion compensation is the process of digital alignment of phase error for each radar return in a SAR frame forming a SAR image due to the change in position of scatterers relative to the moving platform. The motion of the moving platform with respect to a focus point is typically measured using accelerometers coupled to GPS/INS systems. Motion compensation is performed in an airborne processor on each I+jQ sample of a radar return. The exact form of motion compensation depends on the method used to compile the SAR image from the radar returns.

This invention employs a common transmitted waveform to detect fixed and moving ground targets using two simultaneous antenna channels ($\Sigma$ and $\Delta$) to image the scene. Doppler beam sharpening methods extract high resolution images within short array times for fast moving airborne platforms, or at shorter ranges typical of low cost radars. While the concept is described for only two channels, it can be extended to four channels, convering elevation and azimuth for example.

Figure 2:
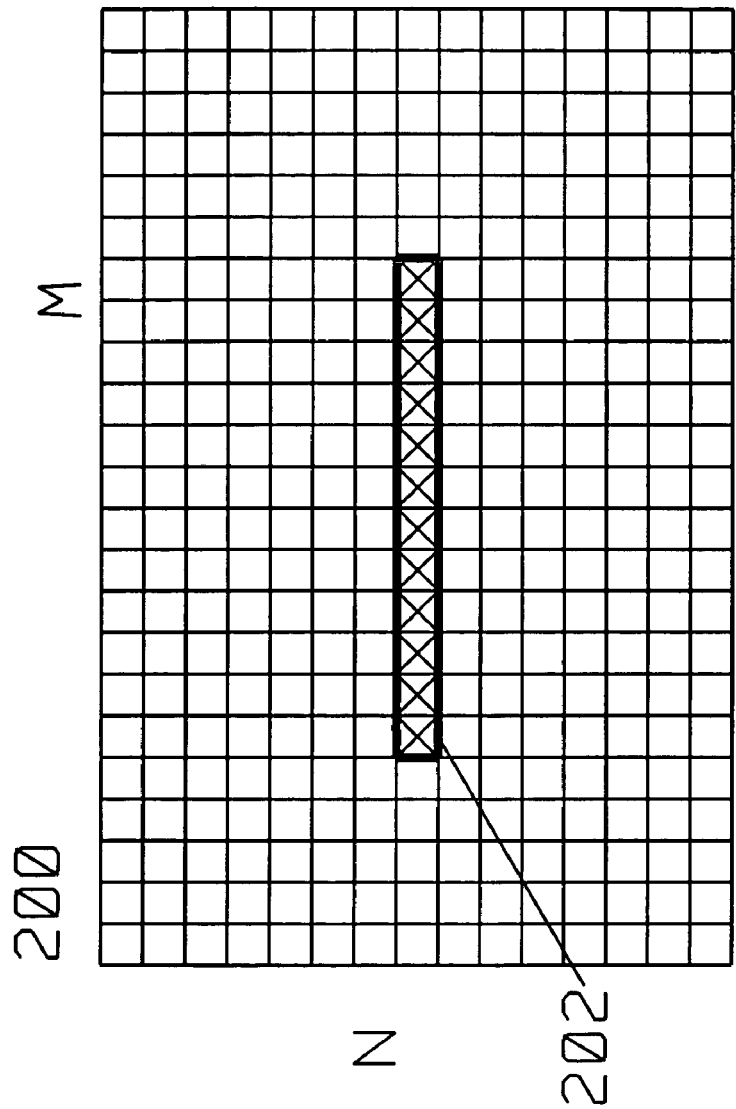
FIG. 2 shows a typical SAR map applicable to this invention using the SUM Σ and Difference Δ channels.

With high resolution Doppler Beam Sharpened SAR images, ground targets extend over several pixels of the SAR image. A high resolution SAR map data used in this invention is shown in FIG. 2. The SAR data 200 shown in FIG. 2 contains two SAR images superimposed on a pixel by pixel basis:

a) the first N by M pixel SAR image is acquired using the $\Sigma$ antenna channel.

b) the second (same) N by M pixel SAR image is acquired using the $\Delta$ antenna channel.

Both the $\Sigma$ and $\Delta$ SAR image is acquired using the same waveform. That is, for one transmitted pulse of a particular waveform, the returned $\Sigma$ and $\Delta$ I+jQ samples are digitized at the same time typically using separate A/D converters. If a single A/D converter is used for both channels, the digital stream emerging from the A/D converter is adjusted for the time delay between A/D conmversions.

With two separate A/D converters, one for the $\Sigma$ channel, the other for the $\Delta$ channel, operating at the same start time and conversion rate, motion compensation and subsequent computation to create the SAR image is essentially the same for both $\Sigma$ and $\Delta$, reducing the computational load.

While this application describes a single sum and difference channel, the same principle applies where a monopulse antenna having four sectors is used in both elevation and azimuth. The method herein can be used extended for detecting moving targets concurrently in elevation as well as azimuth.

The group of pixels 202 within SAR image 200 are to analyzed for the presence of a moving and/or fixed ground target.

Figure 3:
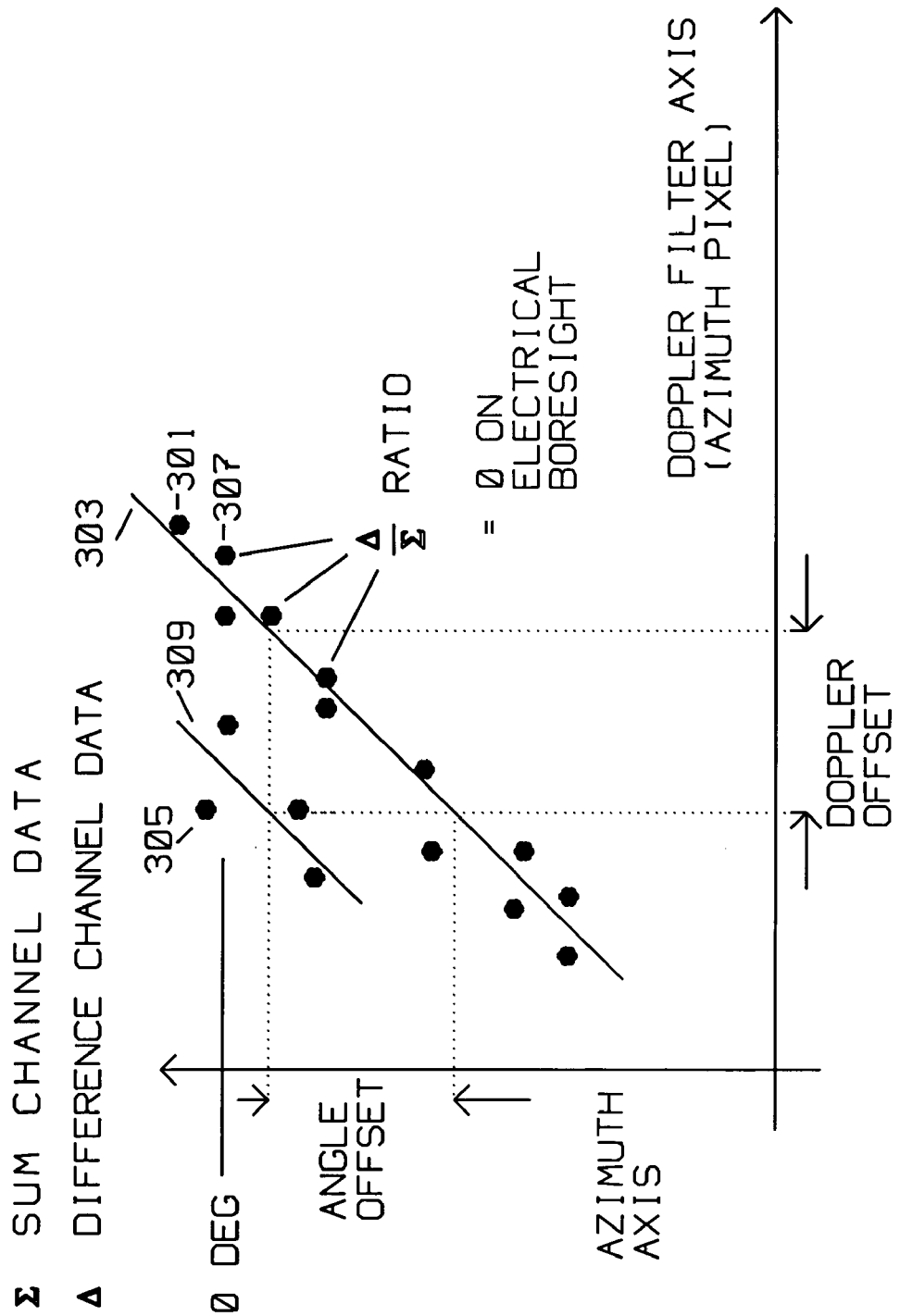
FIG. 3 shows the geometric relationship of points defined by forming the ratio $$\frac{\Delta}{\Sigma}$$

FIG. 3 shows the concept involved in the detection of moving and/or fixed ground targets within SAR image 200 in accordance with this invention. The $\Delta$ and $\Sigma$ complex channel data in the identified target pixels, such as 202, are used to obtain an accurate angle estimate of the target.

As shown in FIG. 3, the ratio $\Delta/\Sigma$ is formed for each pixel of interest in SAR image 200. That is, for example, pixel N1, M1 for the $\Sigma$ channel forms the ratio N1 to M1 pixel for the $\Delta$ channel. Note that each SAR pixel is a complex number. Thus the $\Delta/\Sigma$ ratio is typically computed using complex variables:

$$\frac{\Sigma^* \Delta}{\Sigma \cdot \Sigma^*}$$

On the electrical boresight this ratio will be 0. However, away from the electrical boresight, plotting the ratio for each set of non-moving pixels appearing on the $\Delta$ and $\Sigma$ SAR map will generally define a least square fit, straight line 303. Line 303, the (stationary) background discriminant, is obtained by computing a least squares fit to points such as 301 and 307, the angle discriminant data. Points 301 and 307 on line 303 are examples of pixels where the ratio of $\Delta/\Sigma$ indicates that predominantly stationary (not moving) scatterers contribute to the returned radar energy for that pixel. That is, within pixels that define the $\Delta/\Sigma$ ratio at points 301 and 307 there is a predominance of stationary ground targets and/or scatterers.

However, if the $\Delta/\Sigma$ ratio for one or more pixels in the SAR image falls near a least square fit line separate from line 303, such as line 309, then a moving scatterer is declared for those pixels on line 309. Such an example of a moving scatterer is ratio 305, close to line 309. Line 309 is a least square fit for points such as 305, and is the (moving) target least square fit of angle discriminant. Line 309 is at a Doppler offset and angle offset from line 303. Since point 305 is near line 309, it is concluded that the pixel corresponding to point 305 contains a moving target (scatterer). Line 303 has a different intercept along the azimuth direction as compared to line 309. However, the slope of line 303 and 309 are relatively similar, as that slope is defined generally by monopulse antenna characteristics.

The derived target angle is compared to the angular location of the surrounding pixels. If the angle of the target (e.g. pixels 202) differs beyond a threshold from the angle of radar returns surrounding it, it is concluded the target is a moving target. The range rate of the target relative to clutter is proportional to the angle offset.

The method is further detailed in FIG. 4. Monopulse radar antenna 402 receives a radar returns from a scene. A sum channel output Σ 404 and a difference channel Δ 412 is generated by monopulse antenna 402. The sum channel output I+jQ 406 is digitized and motion compensated in motion compensation Σ 408. Similarly, the Δ channel output I+jQ 414 is digitized and motion compensated in motion compensation Δ 416. It is envisioned that the digitization process is concurrent in both the Σ and Δ channel, i.e. the A/D converters start conversion at the same time at the same A/D conversion rate. Compute SAR image from Sum Channel 410 generates the sum channel SAR image pixels, of size N by M. Compute SAR image from Difference (Delta) Channel 418 generates the Δ channel SAR pixels image pixels, of the same size N by M.

Ratio compute 420 computes the ratio Δ/Σ for those pixels descriptive of a target area, such as 202, as well as for a number K of pixels surrounding the target area. K is typically 20 pixels beyond the target area in both the N+K and M+K direction. The N+K and M+K pixels define a background area used for comparison with the target area.

Least square fit of angle discriminant data 422 fits a straight line through those pixels descriptive of the target area, as well as the N+K, M+K pixels descriptive of the background area. Note that the slopes of the straight lines fit to the sample pixels will be the same for the moving target pixels as well as the background pixels.

Report target angle offset and Doppler offset 424 identifies departures of the target pixels (line 309) from the background pixels (line 303) by comparing the location of the respective least square fit of the angle discriminant.

All references cited in this document are incorporated herein in their entirety by reference.

Although presented in exemplary fashion employing specific embodiments, the disclosed structures are not intended to be so limited. For example, although the method herein is described in the context of a radar system, it is also applicable for sonar, or similar imaging methods, where the concept of a monopulse antenna is applicable.

Those skilled in the art will also appreciate that numerous changes and modifications could be made to the embodiment described herein without departing in any way from the invention. For example, a four channel monopulse can be used with this invention, locating moving targets with increased probability of detection.

The invention claimed is:

1. A radar on a moving platform for generating a focused synthetic aperture image of a scene from a sequence of periodic pulse returns from said scene, said scene containing a target described by pixels within said synthetic aperture image, said pulse returns motion compensated for the motion of said moving platform with respect to said scene, said radar comprising:
   a monopulse antenna having a sum channel output and a difference channel output;
   a first analog to digital converter for converting said sum channel output into a sum channel digital stream;
   a second analog to digital converter for converting said difference channel output into a difference channel digital stream;
   said first analog to digital converter and said second analog to digital converter performing analog to digital conversion at a start time and a rate;
   a computer for:
   receiving said sum channel digital stream and said difference channel digital stream;
   generating a plurality of sum synthetic aperture image pixels from said sum channel digital stream;
   generating a plurality of difference synthetic aperture image pixels from said difference channel digital stream;
   computing a target ratio of said difference synthetic aperture image pixels to said sum synthetic aperture image pixels for said sum synthetic aperture image pixels descriptive of said target;
   computing background ratios of said difference synthetic aperture image pixels to said sum synthetic aperture image pixels for said difference synthetic aperture image pixels descriptive of a background around said target;
   computing a target least square fit of angle discriminant using said target ratios;
   computing a background least square fit of angle discriminant using said background ratios;
   comparing said target least square fit of angle discriminant with said background least square fit angle discriminant to identify an angle offset and a Doppler offset of said target with respect to said background.

2. A radar system as described in claim 1 wherein said target least square fit angle discriminant is represented by a first line having a first slope and a first intersect along an azimuth axis.

3. A radar system as described in claim 2 wherein said background least square fit angle discriminant is represented by a second line having said first slope and a second intersect along said azimuth axis.

4. A radar system as described in claim 3 wherein said angle offset is computed by subtracting said second intersect from said first intersect along said azimuth axis.

5. A radar system as described in claim 4 wherein said Doppler offset is computed from the projection of intersections of said angle offset with said first line and said second line on a Doppler filter axis.

6. A radar system as described in claim 4 wherein said background least square fit of angle discriminant using said background ratios is computed for a region of 20 by 20 sum synthetic aperture pixels around said target.

7. A method for operating a radar on a moving platform for generating a focused synthetic aperture image of a scene from a sequence of periodic pulse returns from said scene, said scene containing a target described by pixels within said synthetic aperture image, said pulse returns motion compensated for the motion of said moving platform with respect to said scene, said method comprising the steps of:
   receiving reflected radar energy using a monopulse antenna having a sum channel output and a difference channel output;
   converting said sum channel output into a sum channel digital stream using a first analog to digital converter;
   converting said difference channel output into a difference channel digital stream using a second analog to digital converter;

timing said first analog to digital converter and said second analog to digital converter to perform analog to digital conversion at a start time and a rate;

generating a plurality of sum synthetic aperture image pixels from said sum channel digital stream;

generating a plurality of difference synthetic aperture image pixels from said difference channel digital stream;

computing a target ratio of said difference synthetic aperture image pixels to said sum synthetic aperture image pixels for said sum synthetic aperture image pixels descriptive of said target;

computing background ratios of said difference synthetic aperture image pixels to said sum synthetic aperture image pixels for said difference synthetic aperture image pixels descriptive of a background around said target;

computing a target least square fit of angle discriminant using said target ratios;

computing a background least square fit of angle discriminant using said background ratios;

comparing said target least square fit of angle discriminant with said background least square fit angle discriminant to identify an angle offset and a Doppler offset of said target with respect to said background.

8. A method as described in claim 7 wherein said target least square fit angle discriminant is represented by a first line having a first slope and a first intersect along an azimuth axis.

9. A method as described in claim 8 wherein said background least square fit angle discriminant is represented by a second line having said first slope and a second intersect along said azimuth axis.

10. A method as described in claim 9 wherein said angle offset is computed by subtracting said second intersect from said first intersect along said azimuth axis.

11. A method as described in claim 10 wherein said Doppler offset is computed from the projection of intersections of said angle offset with said first line and said second line on a Doppler filter axis.

12. A method as described in claim 11 wherein said background least square fit of angle discriminant using said background ratios is computed for a region of 20 by 20 sum synthetic aperture pixels around said target.

* * * * *